United States Patent [19]

Goodman et al.

[11] E Re. 30,170

[45] Reissued Dec. 18, 1979

[54] HYDROLYZABLE POLYMERS OF AMINO ACID AND HYDROXY ACIDS

[75] Inventors: Murray Goodman, Brooklyn, N.Y.; Gerald S. Kirshenbaum, Fanwood, N.J.

[73] Assignee: Sutures, Inc., Coventry, Conn.

[21] Appl. No.: 842,379

[22] Filed: Oct. 11, 1977

Related U.S. Patent Documents

Reissue of:

[64] Patent No.: 3,773,737
Issued: Nov. 20, 1973
Appl. No.: 151,577
Filed: Jun. 9, 1971

U.S. Applications:

[63] Continuation of Ser. No. 565,076, Apr. 4, 1975, abandoned.

[51] Int. Cl.[2] ..... C08G 69/10; C08G 69/44

[52] U.S. Cl. ..... 528/327; 128/335.5; 264/176 F; 528/328; 525/419; 264/290.7

[58] Field of Search ..... 260/78 A; 528/327, 328

[56] References Cited

U.S. PATENT DOCUMENTS

| | | | |
|---|---|---|---|
| 2,071,250 | 2/1937 | Carothers | 260/78 A |
| 2,697,085 | 12/1954 | Bamford et al. | 260/29.2 |
| 3,089,749 | 5/1963 | Ballard | 260/78 A |
| 3,371,069 | 2/1968 | Miyamae et al. | 260/78 A |

FOREIGN PATENT DOCUMENTS

| | | |
|---|---|---|
| 42-11672 | 7/1967 | Japan . |
| 1099184 | 1/1968 | United Kingdom . |

OTHER PUBLICATIONS

Chem. Abstracts, vol. 67, 1967, 100555m, Ishida et al.
Kirk-Othmer, Encyclopedia of Chem. Technology, 2nd Ed., vol. 16, p. 1.
Your Choice of Suture (1970) and Deknatel Sutures.
Webster's New World Dictionary, 2nd College Ed., 1972, p. 1435.
Webster's Third New International Dictionary, 1961, p. 2304.

*Primary Examiner*—Howard E. Schain
*Attorney, Agent, or Firm*—Larson, Taylor and Hinds

[57] ABSTRACT

Hydrolyzable film- and fiber-forming polymers having a plurality of repeating units of the formula:

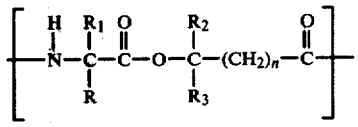

wherein R is lower alkyl, aryl, alkaryl and aralkyl; $R_1$, $R_2$ and $R_3$ are each selected from H or lower alkyl with the proviso that at least one of $R_1$, $R_2$, $R_3$ is H; and n is an integer of 0 to 2.

5 Claims, No Drawings

HYDROLYZABLE POLYMERS OF AMINO ACID AND HYDROXY ACIDS

Matter enclosed in heavy brackets [ ] appears in the original patent but forms no part of this reissue specification; matter printed in italics indicates the additions made by reissue.

*This is a continuation of application Ser. No. 565,076 filed Apr. 14, 1975 and now abandoned.*

This invention relates to a novel class of high molecular weight condensation polymers. More particularly, the present invention is directed to hydrolyzable, high molecular weight, linear polydepsipeptides in which ester bonds, derived from α-, β- and γ-hydroxy acid residues, are incorporated at intervals along an otherwise peptide backbone. The polymers of the invention display excellent physical, chemical and biological properties which make them useful as shaped structures such as self-supporting films, fibers and the like. In particular, the polymers of the invention possess unique hydrolysis characteristics which make them especially useful in the preparation of synthetic absorbable sutures.

The vast majority of absorbable sutures today are made from natural proteinaceous polymeric materials such as a silk and reconstituted collagen or gut. Ordinarily, breakdown and internal body absorption of these materials requires a complex and unpredictable enzymatic reaction which frequently poses a number of problems. Consequently, efforts have been made to develop synthetic absorbable sutures which breakdown by simple hydrolysis. The only sutures of this type which have found any acceptance are those fabricated from polylactides and polyglycolides. Sutures prepared from polylactides and polyglycolides are not without their shortcomings, however, the foremost of which is their ready hydrolysis. In other words, sutures of these materials hydrolyze so quickly that they fail to retain their tensile strength for a period of time considered necessary by many for properly healing of the sutured wound or incision.

It is an object of the present invention, therefore, to provide a polymeric material which is decomposable by simple hydrolysis under basic, neutral or acid conditions but which requires significantly longer periods of time for such decomposition than found for polylactides and polyglycolides of similar molecular weight.

Another object of the invention is to provide a polymer which while possessing said hydrolyzable properties can be shaped into self-supporting films and fibers characterized by high tensile strength and other characteristics desirable of such films and fibers.

Yet another object of the invention is to provide synthetic absorbable sutures which retain the desired strength characteristics for proper healing of wounds and incisions stitched therewith but which will thereafter be broken down by simple body hydrolysis.

These and other objects of the invention are obtained by a novel group of polymers characterized by a repeating unit having the following structural formula:

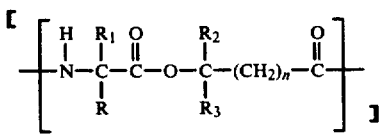

-continued

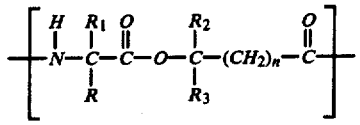

wherein R is a lower alkyl, say of 1 to 5 carbons, aryl, alkyaryl or aralkyl; $R_1$, $R_2$ and $R_3$ are each selected from H or lower alkyl, with the proviso that at least one of $R_1$, $R_2$ and $R_3$ is H; and n is the integer of 0 to 2.

The polymers of the invention may be prepared by polymerizing condensible derivatives, such as the anhydrides or anhydrosulfites, of α-amino acids having the structure:

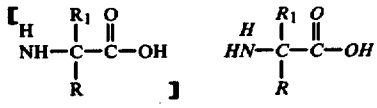

and hydroxy organic acids having the structure:

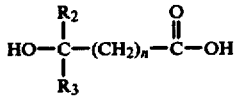

wherein R, $R_1$, $R_2$, $R_3$ and n have the values assigned above. Advantageously, the polymers of the invention may be prepared by reacting at least one N-carboxy-α-amino anhydride having the structure:

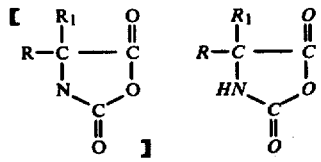

with at least one androsulfite of an hydroxy organic carboxylic acid having the structure:

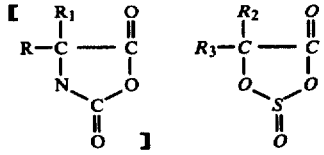

wherein R, $R_1$, $R_2$ and $R_3$ have the values assigned above.

Illustrative of N-carboxy-α-amino compounds suitable for preparation of the polymers of the invention may be included the anhydrides of alanine, 2-amino-n-butyric acid, 2-aminoisobutyric acid, 2-aminopentanoic acid, 2-amino-n-hexanoic acid, valine, leucine, isoleucine, 2-amino-2-methylpropionic acid, 2-amino-2-ethylpropionic acid, 2-amino-2-methyl-heptanoic acid, 2-amino-2-propylpropionic acid, 2-amino-2-phenyl-propionic acid, 2-amino-2-tolyl-propionic acid, phenylalanine and the like.

Exemplary of anhydrosulfite reactants suitable for use in the preparation of the polymers of the invention are the anhydrosulfites of 2-hydroxyethanoic acid, lactic acid, 2-hydroxypropanoic acid, 2-hydroxyheptanoic acid, 2-hydroxypentanoic acid, 2-hydroxyhexanoic acid, 2-hydroxyheptanoic acid, hydroxyisobutyric acid, 2-hydroxy-2-ethylpropanoic acid, 2-hydroxy-2-ethylpropanoic acid, 2-hydroxy-2-propyl-propanoic acid, 2-hydroxy-2-butylbutanoic acid, etc.

Polymers of the invention may also be prepared by reacting at least one of the aforementioned N-carboxy-α-amino anhydrides with a lactone having the structure:

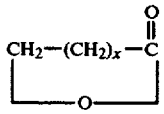

wherein x is an integer of 1 to 2. Suitable lactones include for instance, β-propiolactone and γ-butyrolactone.

Although polymers of the invention may be terpolymers or interpolymers of three or more dissimilar monomers, they are preferably copolymers of a single N-carboxy-α-amino acid anhydride and a single hydroxy organic acid anhydrosulfite. Infrared analysis and NMR (nuclear magnetic resonance) measurements indicate the polymers of the invention be linear polymers composed of block and/or alternating N-carboxy-α-amino acid residues and hydroxy organic residues, the backbone of the polymer having the aforementioned repeating units:

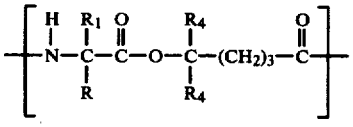

wherein R, $R_1$, $R_2$, $R_3$ and n is defined as above. Hydrolysis tests establish that the polymers are definitely copolymers and not homopolymers. Furthermore, the polymers are found to be soluble in benzene which shows them to be copolymers since the homopolypeptides are not soluble in benzene.

The polymerization or condensation reaction can be conducted by simply adding the reactants with or without a catalyst or initiator to a suitable inert liquid diluent and heating the reactants under preferably anhydrous conditions to reaction temperature. Generally equimolar amounts of the reactants are used since a large excess of one or the other limits the extent of polymerization and the reaction carried out under reflux conditions.

In the preparation of the polymers of the invention, it is preferred that the molecular weight of the resulting polymer be such that its intrinsic viscosity be at least about 0.08 preferably at least about 0.3 to 5.0. The intrinsic viscosity is measured at 30° C. in trifluoroacetic acid.

The inert liquid diluents in the polymerization reaction are those non-reactive with either of the starting materials or the polymer product. Preferably the inert liquid diluent is an organic solvent for the starting materials but a non-solvent for the polymeric product. Suitable inert liquid diluents which can be used include, for example, aromatic hydrocarbons such as benzene, toluene, xylene and the like, chlorinated hydrocarbons such as chlorobenzene; aliphatic hydrocarbons such as n-hexane, n-heptane; halogenated aliphatic hydrocarbons such as dichloromethane, tetrachloroethane; monohydric phenols such as phenol, m-cresol, p-cresol, xylenol and the like. Other suitable diluents will be obvious to those skilled in the art.

Although the polymerization may often be conducted in the absence of a catalyst or initiator, use of a catalyst is preferred and in some instances necessary. Suitable catalysts include tertiary amines such as tributyl amine, triamyl amine, triethyl amine, pyridine, quinoline, N,N-dimethyl aniline, etc; alkali metal alkoxides such as sodium methoxide, sodium ethoxide, potassium propoxide and the like. The concentration of the catalyst may vary widely but generally is employed in an anhydride reactant to catalyst weight ratio of about 500 to 1,000.

Since in addition to the repeating ester units, the polymers of the invention contain recurring amide linkages, it should be understood that the polymer should contain a sufficient number of ester bonds to endow it with the desired hydrolyzable properties. Generally, the polymers of the invention will contain at least 15 mole percent of the aforementioned repeating ester units based on the total number of ester and amide units in the polymer. When the intended use of polymers of the invention is for the preparation of fibers for synthetic sutures fabrication, it is preferred that the polymer contain no more than about 90 mole percent of said repeating ester units since polymers containing in excess of 90 mole percent of the ester units undergo too rapid hydrolysis. In most instances, therefore, the preferred polymers of the invention contain about 40 to 60 mole percent of the defined repeating ester units. The particular concentration of ester units in the polymer will depend in part on the polymerization conditions, the reactants polymerized, the activity of the particular monomers employed, the presence or absence of catalyst and the particular catalyst employed and its concentration.

The melting points of the polymers of the invention will vary depending primarily upon the monomers employed and the proportions of amide and ester residues in the polymer. In general, the polymers have melting points of at least 150° C. up to 350° C. or more.

The following examples are included to further illustrate preparation of the copolymers of the invention.

In the examples:

The infrared spectra were recorded on a Perkin-Elmer model 521 grating infrared spectrometer. The spectra were obtained in the solid state as potassium bromide pellets, or as oils using sodium chloride cells.

The nuclear magnetic resonance measurements were carried out on a Varian Associates A-60 analytical NMR spectrometer and a Varian Associates HR-220 high resolution NMR spectrometer. Tetramethylsilane (TMS) was used as the internal standard. Concentrations of 10% were used for the A-60 instrument, while concentrations of 2-4% were used with the HR-220 instrument. All spectra were recorded at room temperature.

The intrinsic viscosities of the polymers were determined using standard Cannon viscometers (numbers 25, 50, and 100). The flow times were recorded with a hand stopwatch which was calibrated to 0.1 second. The intrinsic viscosities were determined in trifluoroacetic acid in accordance with the following equation:

$$[N]=(N_{sp.}/C)_{c.=0}$$

in a thermostated, constant temperature water bath at 30°.

EXAMPLE I

Synthesis of the monomers (a) L-alanine N-carboxyanhydride (4-methyl-L-2,5-oxazolidinedione).-L-alanine (7.5 g., 0.084 mole) was suspended in 300 ml. of dry tetrahydrofuran. The system was purged with nitrogen for one hour. The suspension was then treated with phosgene at 50° for three hours until the L-alanine had completely dissolved. The system was then purged with nitrogen for two hours. The solvent and remaining gases were removed under reduced pressure, and a white material was obtained which was washed with hexane. This material was recrystallized several times from ethyl acetate-hexane in a dry box. This reaction yielded 7.0 g. (73%) of the N-carboxyanhydride, M.P. 90°-91° [lit. M.P.90°].

(b) α-Aminoisobutyric acid N-carboxyanhydride (4,4-dimethyl-2,5-oxazolidinedione).—This compound was prepared according to the procedure in W. R. Sorenson and T. W. Campbell, "Preparative Methods of Polymer Chemistry," 2nd ed., Interscience Publishers, New York, 1968, p. 355 on a 0.15 mole scale. This reaction furnished the desired product in 70% yield with a M.P. 95°-96° [lit. M.P. 95-97].

(c) α-Hydroxyisobutyric acid anhydrosulfite.—This compound was prepared using the procedure in Sorenson and Campbell, supra; p. 359 on a 0.20 mole scale. This reaction furnished the desired product in 40% yield with a B.P. 55° at 10 mm. Hg [lit. B.P. 53°-55° at 16 mm Hg]. The compound was prepolymerized prior to use.

(d) S-lactic acid anhydrosulfite. This compound was prepared using the procedure in Sorenson and Campbell, supra; for the α-hydroxyisobutyric acid anhydrosulfite. Instead of purifying this monomer by prepolymerization, it was distilled three times under reduced pressure. The reaction furnished the desired product in 40% yield with a B.P. 71°-72° at 16 mm. Hg [lit. B.P. 72°-74° at 19 mm. Hg].

In the synthesis of the copolymers prepared in the examples below, unless otherwise indicated, the following general procedure was employed:

A round-bottom flask was dried in the oven for three hours. To the flask, which was cooled under nitrogen, was added 40 ml. of benzene. In order to make sure that the system was completely dry, about 20 ml. of the benzene was distilled from the reaction vessel. The flask was cooled under nitrogen in an ice-salt bath until the benzene had frozen, and the reactants were then added to the flask. The reaction mixture was refluxed for several days under nitrogen to give a cloudy colorless gel. The gel was separated by filtration to give a solid polymer.

EXAMPLE II

Copolymers of L-alanine and S-lactic acid—Reaction 1

L-alanine N-carboxyanhydride (1.0 g., 0.0087 mole), S-lactic acid anhydrosulfite (1.0 ml.) and dry triethylamine (0.00243 ml., $1.74\times10^{-5}$ mole, anhydride-to-initiator ratio of 500) were added to the reaction flask. This was refluxed for four days under nitrogen. A white precipitate was obtained which was isolated by filtration. This powder was washed with hot benzene to eliminate any polylactic acid homopolymer that might have been formed during the polymerization. The white powder was dissolved in hot chloroform. However, the product only partially dissolved, and therefore a soluble fraction (sample 1) and an insoluble fraction (sample 2) were isolated by filtration. The insoluble fraction was reprecipited from trifluoroethanol-petroleum ether, while the soluble fraction was reprecipitated from chloroform-petroleum ether and then trimethyl phosphate-petroleum ether. Integration of the NMR spectra showed that sample 1 consisted of three lactic acid residues for each alanine residue, while sample 2 had one alanine residue for each lactic acid residue. Both samples decomposed between 250°-280°. The reaction furnished about 100-200 mg. of each sample. The infrared spectra of both compounds, exhibited an ester peak at 1755 cm.$^{-1}$, an amide II peak at 1540 cm.$^{-1}$, and a split amide I peak at 1655 and 1625 cm.$^{-1}$. There was not enough material to have elemental analysis performed on the insoluble fraction. However, elemental analysis was performed on the soluble fraction, sample I.

Analysis.—Calcd. (for the monomer ratio as determined from the integration of the NMR spectrum) (percent): C, 50.46; H, 6.59; N, 13.09. Found (percent): C, 44.79; H, 5.87; N, 3.92.

Reaction 2.—This reaction was performed exactly as in reaction 1 except in this case the anhydride-to-initiator ratio was 50. A white precipitate was isolated by filtration. The powder was washed with hot benzene to eliminate any polylactic acid homopolymer that might have formed during the polymerization. The white powder was insoluble in hot chloroform. This reaction furnished about 0.75 g. of the copolymer. Integration of the NMR spectrum showed that this copolymer contained two alanine residues for each lactic acid residue. The material decomposed between 210° and 260°. The infrared spectrum exhibited an ester peak at 1745 cm.$^{-1}$, an amide II peak at 1525 cm.$^{-1}$, and an amide I peak at 1655 cm.$^{-1}$ with a shoulder at 1625 cm.$^{-1}$. The intrinsic viscosity in trifluoroacetic acid at 30° was 0.191. Hydrolysis data showed that the material was a copolymer and not two homopolymers.

Analysis.—Calcd. (for the monomer ratios as determined from the integration of the NMR spectrum) (percent): C, 50.46; H, 6.59; N, 13.09. Found (percent): C, 47.75; H, 5.87; N, 11.79.

EXAMPLE III

Copolymer of L-alanine and α-hydroxyisobutyric acid

L-alanine N-carboxyanhydride (1.0 g., 0.0087 mole), α-hydroxyisobutyric acid and anhydrosulfite (1.0 ml.) and dry triethylamine (0.0243 ml., $1.74\times10^{-4}$ mole, anhydride-to-initiator ratio of 50) were added to the reaction flask. This was refluxed for four days under nitrogen. A white precipitate was obtained which was isolated by filtration. The compound was washed with hot benzene and hot chloroform in order to eliminate any homopolyester that might have been formed during the reaction. The reaction furnished about 0.6 g. of the copolymer. The material did not melt or decompose below 275°. Integration of the NMR spectrum showed that the copolymer contained three residues of alanine for each α-hydroxyisobutyric acid residue. The intrinsic viscosity of the polymer in trifluoroacetic acid at 30° was 0.084. The infrared spectrum exhibited a medium ester peak at 1745 cm.$^{-1}$, an amide II peak at 1525 cm.$^{-1}$, and a strong amide I peak at 1650 cm.$^{-1}$ with a shoulder at 1625 cm.$^{-1}$. Hydrolysis data showed that the material was a copolymer and not two homopolymers.

Analysis.—Calcd. (for the monomer ratio as determined from integration of the NMR spectrum) (percent): C, 52.16; H, 7.07; N, 14.04. Found (percent): C, 49.09; H, 6.87; N, 13.45.

EXAMPLE IV

Copolymer of S-lactic acid and α-aminobutyric acid

α-Aminoisobutyric acid N-carboxyanhydride (0.2 g., 0.00155 mole), S-lactic acid anhydrosulfite (0.2 ml.), and dry triethylamine (0.00432 ml., $3.1\times10^{-5}$ mole, anhydride-to-initiator ratio of 50) were added to the reaction flask. This was refluxed under nitrogen for one week but no precipitate had formed. A small amount of petroleum ether was added, and a white precipitate immediately formed. This material was isolated by filtration. Upon adding more petroleum ether and cooling in the refrigerator overnight a second precipitate had formed. This second crop proved to be polylactic acid homopolymer. The copolymer was reprecipitated from benzene-petroleum ether and about 150 mg. of the polymer was obtained. The copolymer appeared to soften between 133°-140° and underwent total decomposition by 230°. Integration of the NMR spectrum showed that the copolymer contained three lactic acid residues for each α-aminoisobutyric acid residue. The infrared spectrum exhibited a very strong ester peak at 1755 cm.$^{-1}$, and weak to medium amide peaks at 1655 and 1528 cm.$^{-1}$.

Analysis:—Calcd. (for the monomer ratios as determined from integration of the NMR spectrum (percent): C, 51.82; H, 6.36; N, 4.65. Found (percent): C, 36.69; H, 4.32; N, 2.05.

EXAMPLE V

Copolymers of L-alanine and β-propiolactone

In each of the following reactions L-alanine N-carboxy anhydride (1 mole) was stirred in β-propiolactone (2 moles) at room temperature. The polymers were isolated and purified. The infrared spectra exhibited a strong ester peak at 1738 cm.$^{-1}$, an amide II peak at 1525 cm.$^{-1}$ for each copolymer. The copolymers did not melt or decompose below 300°. Hydrolysis data showed that these compounds were indeed copolymers.

Reaction 1.—No catalyst was used in this reaction. Integration of the NMR spectrum showed that the copolymer contained three alanine residues for each β-propiolactone residue. The intrinsic viscosity of the copolymer in trifluoroacetic acid at 30° was 0.352.

Analysis.—Calcd. (for the monomer ratio as determined from integration of the NMR spectrum) (percent): C, 50.48; H, 7.06; N, 14.93. Found (percent): C, 50.52; H, 6.71; N, 14.73.

Reaction 2.—Sodium methoxide was used as a catalyst with anhydride-to-initiator ratio of 1000. The integration of the NMR spectrum showed that the copolymer contained one alanine residue for each β-propiolactone residue. The intrinsic viscosity of the copolymer in trifluoroacetic acid at 30° was 0.345.

Analysis.—Calcd. (for the monomer ratio as determined from integration of the NMR spectrum) (percent): C, 50.50; H, 6.04; N, 10.21. Found (percent): C, 50.35; H, 6.34; N, 9.79.

Reaction 3.—Benzylamine was used as a catalyst with an anhydride-to-initiator ratio of 1000. The integration of the NMR spectrum showed that the copolymer contained three alanine residues for every two β-propiolactone residues. The intrinsic viscosity of the copolymer in trifluoroacetic acid at 30° was 0.415.

Analysis.—Calcd. (for the monomer ratio as determined from integration of the NMR spectrum) (percent): C, 50.24; H, 6.84; N, 11.57. Found (percent): C, 50.42; H, 6.49; N, 11.76.

EXAMPLE VI

Alternating copolymer of L-phenylalanine and hydracrylic acid

This polymer had a softening point between 110° and 120°. The infrared spectrum exhibited a strong ester peak at 1740 cm.$^{-1}$ and strong amide peaks at 1650 and 1525 cm.$^{-1}$. Integration of the NMR spectrum showed that the copolymer consisted of one residue of L-phenylalanine for each residue of hydracrylic acid.

The hydrolysis experiments were carried out in the examples below in the following manner:

The polymer (approximately 150 mg.) was placed in concentrated hydrochloric acid (5 ml.), and was allowed to stir at room temperature for five days. The viscosity and infrared spectra of the initial polymers were compared to those of the resulting compounds after the hydrolysis experiments. Any portion of the polymer that did not dissolve in the acid was isolated by filtration and investigated.

HYDROLYSIS OF POLYMERS AND COPOLYMERS

EXAMPLE VII

Poly-S-lactic acid

Poly-S-lactic acid (152 mg.) was placed in concentrated hydrochloric acid (5 ml.), and after five days, the polymer had completely dissolved in the acid. The intrinsic viscosity of the starting polymer in benzene at 30° was 0.14, and the intrinsic viscosity of the polymer after hydrolysis was 0.0066 in hydrochloric acid at 30°. The solution was evaporated to dryness, and an oil was obtained. The infrared spectrum of this oil exhibited a very broad absorption region between 3500 and 2900 cm.$^{-1}$ and a broad band at 1735 cm.$^{-1}$. These peaks are typical of acids. The initial polymer had a sharp peak at 1755 cm.$^{-1}$, an ester peak, and no broad absorption region above 3000 cm.$^{-1}$. The data indicate that poly-S-lactic acid was completely hydrolyzed during the hydrolysis experiment.

EXAMPLE VIII

Poly-L-alanine

Poly-L-alanine (164 mg.) was placed in concentrated hydrochloric acid, and after five days, hardly any of the polymer had dissolved. This material was separated by filtration furnishing over 60 mg. of the undissolved material. The remaining solution was evaporated to dryness. The infrared spectrum of the undissolved material was identical to that of poly-L-alanine. The viscosity ($n_{sp./c.}$) of the undissolved solid was 0.446 in dichloroacetic acid at 30° compared to that of the initial polymer, 0.645. The infrared spectrum of the oil, obtained from evaporation of the solution, exhibited very weak amide peaks. These results indicate that poly-L-alanine is only slightly hydrolyzed by treatment with hydrochloric acid for five days at room temperature.

EXAMPLE IX

Copolymer of L-alanine and α-hydroxyisobutyric acid

The copolymer (170 mg.), which contained three alanine residues for each α-hydroxyisobutyric acid residue, was placed in concentrated hydrochloric acid, and after five days, nearly all of the copolymer had dissolved. Some undissolved material (10–15 mg.) was isolated by filtration. The remaining solution (the filtrate) was then evaporated, and an oil was obtained. The infrared spectrum of the solid sample was identical to that of poly-L-alanine. The viscosity ($n_{sp./c.}$) of this solid was 0.0538 at 30° in trifluoroacetic acid, while the value for the initial copolymer was 0.108 under the same conditions. The infrared spectrum of the oil, obtained from evaporation of the solution, exhibited a very broad acid region at 3500–3000 cm.$^{-1}$, a broad acid peak at 1720 cm.$^{-1}$, but no amide peaks. The facts that only 10–15 mg. of material did not dissolve and that the infrared spectrum of the oil did not contain any amide peaks, but only acid peaks, indicate that the polymer was definitely a copolymer. The solid that was obtained was either a small amount of homopolymer that had not been separated from the copolymer, or some very long blocks of alanine that did not hydrolyze.

EXAMPLE X

Copolymer of L-alanine and S-lactic acid

The copolymer (172 mg.), which contained two residues of alanine for each lactic acid residue, was placed in hydrochloric acid, and after five days, nearly all of the polymer had dissolved. Some undissolved material (10 mg.) was isolated by filtration. The infrared spectrum of this material was identical to that of the initial copolymer. The spectrum exhibited amide peaks at 1630 and 1530 cm.$^{-1}$, an ester peak at 1750 cm.$^{-1}$, and an N-H peak at 3280 cm.$^{-1}$. The viscosity ($n_{sp./c.}$) of this material was 0.0196 in trifluoroacetic acid at 30°, compared to a value of 0.196 for the starting material under identical conditions. Since most of the copolymer dissolved, it appears that the starting material was a copolymer.

The polymers of the invention are a valuable source of synthetic fibers which may be melt spun or extruded through suitable dies or orifices. The extruded filaments or fibers may be cooled by air or by a non-solvent cooling medium after which they may be wound on a reel. The fibers may be drafted between rolls operated at differential speeds, for example, at peripheral speed ratios in the ranges from 4 to 1 to 6 to 1. Better results are usually obtained by allowing the drafting to occur at elevated temperatures.

Hydrolyzable threads or sutures may be prepared from fibers of the polymers of the invention as will be illustrated by the following Example XI.

EXAMPLE XI

Fibers prepared by melt spinning each of the copolymers of Examples II, III, IV, V and VI are each twisted and braided into a polyfilamentous suture on a New England Butt braider machine. This machine is a well known braider and has 8 to 12 carriers in readily available models. Any type of braider is of course suitable. Such machines by varying the number of individual fibers and tensions can provide a wide variety of sutures.

The braided sutures are then hot stretched by pulling the thread under tension over a heated platen maintained at a temperature of about 300° F. This operation serves to substantially reduce elasticity and eliminate memory (that tendency of the fiber to return to its original length). While elongation may vary from about 10 to 15 percent, a braid preferred for surgical use will usually be stretched about 40% during the process. Any suitable device providing the necessary tension and heat is suitable for this step. The thread stretched about 40 to 50 percent is then gathered into a skein.

Samples of each of the sutures prepared are immersed in an aqueous solution maintained at a pH of 7.3 by a standard buffer to approximate the pH conditions of human body fluids. Each of the sutures dissolves in 4 to 6 weeks while retaining a high degree of tensile strength in the interim weeks.

Although the polymers of the invention have been described primarily with regard to their utility as fibers it should be understood that they may also be dissolved in a suitable solvent and cast into hydrolyzable films in accordance with casting methods well known in the art.

What is claimed is:

[1. A hydrolyzable film- and fiber-forming polymer having a plurality of repeating units of the formula:

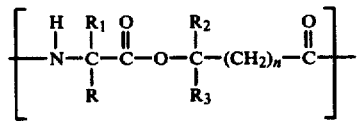

wherein R is lower alkyl, aryl, alkaryl, or aralkyl; $R_1$, $R_2$ and $R_3$ are each selected from H or lower alkyl with the proviso that at least one of $R_1$, $R_2$ and $R_3$ is H; and n is an integer of 0 to 2.]

[2. A film- and fiber-forming polymer of claim 1 wherein R is lower alkyl.]

[3. film- and fiber-forming polymer of claim 2 wherein the lower alkyl is methyl.]

[4. A film- and fiber-forming polymer of claim 1 wherein the R is aralkyl.]

[5. A film- and fiber-forming polymer of claim 1 wherein the aralkyl is benzyl.]

[6. A film- and fiber-forming polymer of claim 1 wherein the repeating unit has the formula:

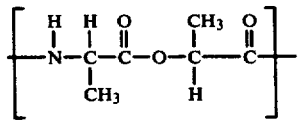

]

[7. A film- and fiber-forming polymer of claim 1 wherein the repeating unit has the formula:

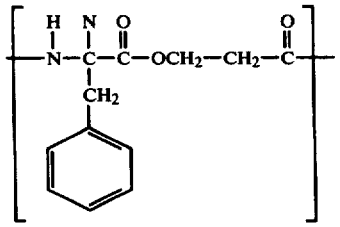

]

[8. A film- and fiber-forming polymer of claim 1 wherein the repeating unit has the formula:

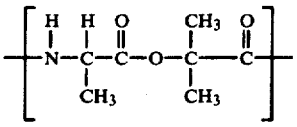

]

[9. A film- and fiber-forming polymer of claim 1 wherein the repeating unit has the formula:

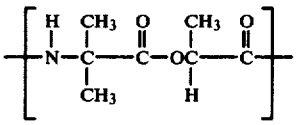

]

[10. A fiber of the polymer of claim 1.]
[11. A fiber of the polymer of claim 6.]
[12. A fiber of the polymer of claim 7.]
[13. A fiber of the polymer of claim 8.]
[14. A fiber of the polymer of claim 9.]

15. [A] *An absorbable* surgical suture [comprising polyfilaments of the polymer of clam 1] *of a hydrolyzable film- and fiber-forming polymer having a plurality of repeating units of the formula:*

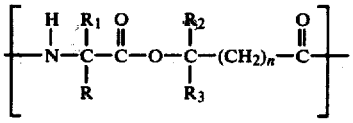

*wherein R is lower alkyl, aryl, alkaryl or aralkyl;* $R_1$, $R_2$ and $R_3$ are each selected from H or lower alkyl with the proviso that at least one of $R_1$, $R_2$ and $R_3$ is H; and n is an integer of 0 to 2.

16. [A] *The* surgical suture [comprising polyfilaments of the polymer of claim 6] *of claim 15 wherein the repeating unit has the formula:*

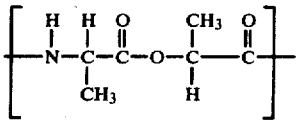

17. [A] *The* surgical suture [comprising polyfilaments of the polymer of claim 7] *of claim 15 wherein the repeating unit has the formula:*

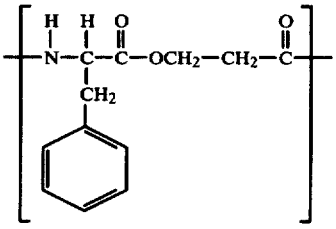

18. [A] *The* surgical suture [comprising polyfilaments of the polymer of claim 8] *of claim 15 wherein the repeating unit has the formula:*

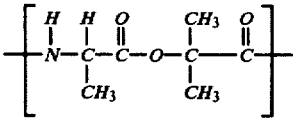

19. [A] *The* surgical suture [comprising polyfilaments of the polymer of claim 9] *of claim 15 wherein the repeating unit has the formula:*

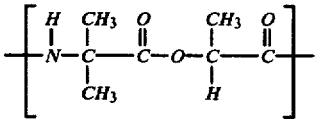

* * * * *